INVENTOR.
FRED H. EASTON
RANDALL H. KRATZ, JR.
BY
ATTORNEYS.

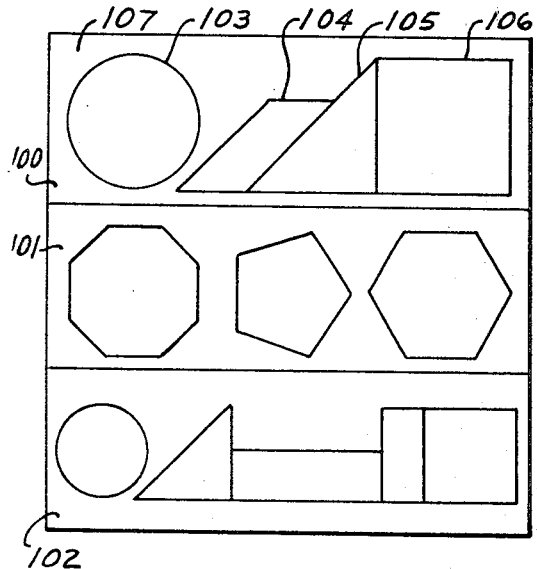
Fig.9
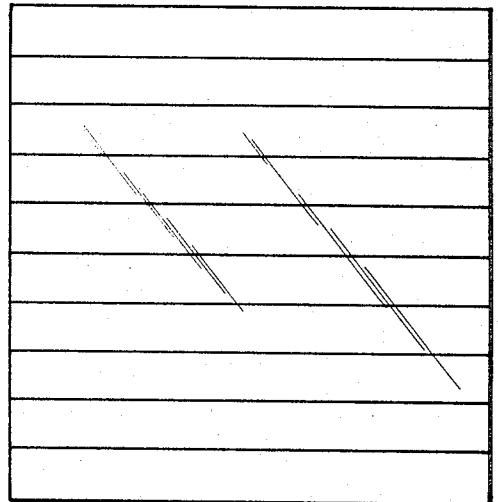
Fig.10
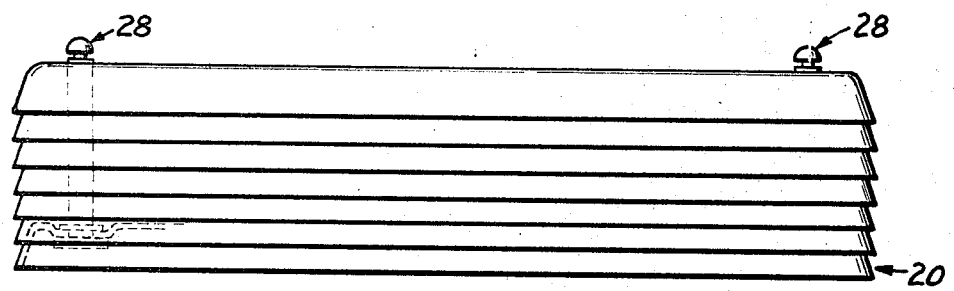
Fig.11
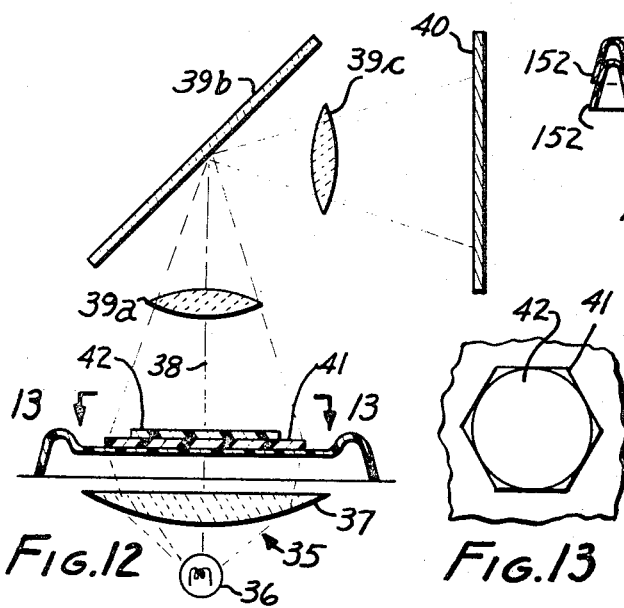
Fig.12  Fig.13
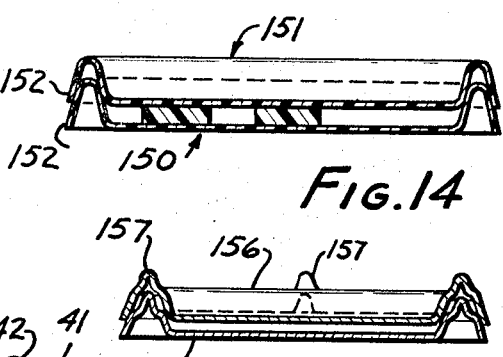
Fig.14
Fig.15
INVENTOR.
FRED H. EASTON
RANDALL H. KRATZ, JR.
BY
ATTORNEYS.

United States Patent Office 3,452,454
Patented July 1, 1969

1

3,452,454
MATHEMATICS TEACHING DEVICE
AND METHOD
Fred H. Easton, 11591 Capri Drive, Garden Grove, Calif.
92641, and Randall H. Kratz, Jr., 4275 Seton Road,
Irvine, Calif. 92664
Filed Feb. 8, 1967, Ser. No. 614,721
Int. Cl. G09b 23/02, 19/02
U.S. Cl. 35—31                                    4 Claims

ABSTRACT OF THE DISCLOSURE

This invention relates to the teaching of mathematics and in particular to a device which includes a transparent tray adapted to support in the throw of a projector, transparent pieces representative of a mathematical feature to be taught.

In its presently preferred embodiment, the invention includes a plurality of stackable trays and the transparent pieces are representative of various numerical and geometrical functions.

---

This invention relates to the teaching of mathematics with the use of an optical projector whose throw is adapted to project transparencies which may be laid in a horizontal plane.

Teachers of mathematics are familiar with the difficulty of teaching mathematical abstractions to students especially when there is no convenient means for portraying them in a physical representation. Even a blackboard has stringent limitations, in that the teacher must be physically in the way of the presentation to at least part of the class, and the size and complexity of the representations he can present is limited because of the nature of the tools he must use at the blackboard.

It is also well known to any person who has ever taught mathematics, that while he is attending to his work at the blackboard, his back is turned to the class, permitting the class to become inattentive and sometimes disorderly.

There is a long standing need for a teaching method and device for accomplishing the method wherein the instructor can work at a projector while still facing the class, and while doing so, to project an image on a screen in front of the class which can easily be been by the whole class, and which can enlarge a small, carefully drawn image. This technique enables the instructor to supervise the class at all times, and when the projector is adapted to project a horizontally-lying representation, it enables the instructor to attend to the matter conveniently in a horizontal plane beside his chair, and even to carefully draw or carefully stack or rearrange items representative of mathematic features or functions, which can be drawn or cut to scale but which will be projected to a size useful to the students in a large class.

There is a further requirement for providing to the instructor grid systems which can be readily used and re-used, together with number strips to illustrate number concepts, base strips for base concepts, and the like, all of which ought to be provided in a plurality of trays which are readily stackable so as to store the various pieces reliably in small bulk and to be easily reached for use.

It is an object of this invention to provide a method and apparatus to accomplish the foregoing features.

A teaching method according to this invention comprises using a projector having means for projecting transparencies laid in a horizontal plane, laying in the throw of the projector a horizontal tray having transparent pieces representative of a mathematic feature to be taught, and then, with the tray in this position, projecting the image on a screen.

A combination according to this invention includes said projector, said tray having a transparent central rectangular portion with a surrounding raised margin to retain a plurality of transparent pieces which are representative of a mathematic feature to be taught, which pieces are adapted to be laid upon the rectangular portion of the tray within the margin.

A mathematics teaching kit according to this invention comprises a plurality of such trays, each of which has a transparent flat rectangular portion and a surrounding raised margin. Each tray also includes lateral restraint means which enables the trays to be stacked in a regular, vertical pile. The kit further includes a plurality of transparent plastic pieces which are representative of a mathematical feature to be taught, which pieces are adapted to be laid upon the rectangular portion of at least one of said trays, and to fit on it within the marginal portion, whereby the material on the tray may be projected onto a screen by a projector whose light is thrown through the said rectangular portion.

According to a feature of the invention, a plurality of posts is mounted to and rises from the marginal portion of one of said trays, the other trays having apertures adapted to engage a respective one of said posts so as to hold the plurality of trays in a stack which may be disassembled by removing the trays from the posts.

According to still another preferred but optional feature of the invention, the rectangular portion is square, and the pieces are provided with perimeters whose contour and dimensions are respective to various mathematic functions.

The above and other features of this invention will be fully understood from the following detailed description in which:

FIGS. 6–10 are plan views showing various assemblies of transparent plastic pieces for use with the tray of FIG. 1;

FIG. 11 is a side elevation showing the presently preferred embodiment of the invention in its stacked configuration;

FIG. 12 is an axial cross-section of a system utilizing the invention;

FIG. 13 is a fragmentary cross-section taken at line 13—13 of FIG. 12; and

FIGS. 14 and 15 are cross-sections showing other embodiments of the invention.

Figure 1:
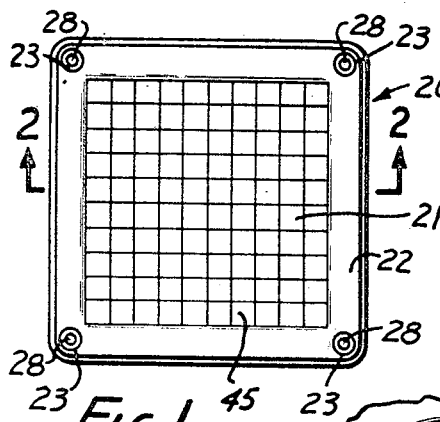
FIG. 1 is a plan view of a portion of the presently preferred embodiment of the invention.
Figure 2:
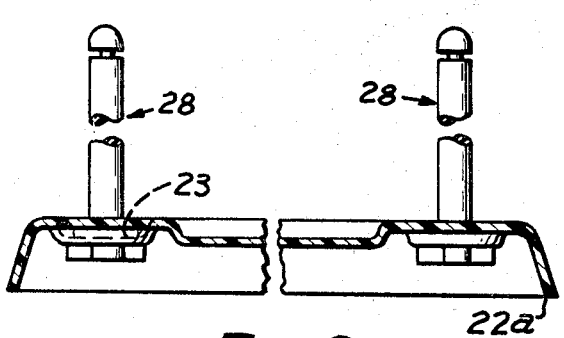
FIG. 2 is a cross-section taken at line 2—2 of FIG. 1.
Figure 5:
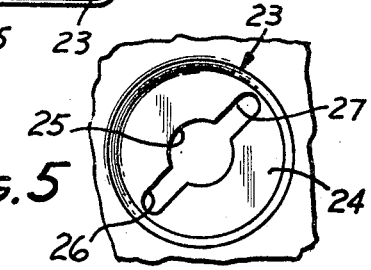
FIG. 5 is an enlarged plan view of a fragment of FIG. 1.
Figure 4:
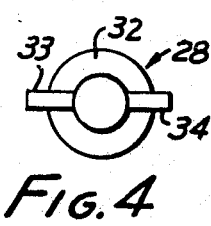
FIG. 4 is a bottom view of FIG. 3 taken at line 4—4 therein.

FIG. 1 illustrates a tray 20 having a central rectangular transparent portion 21 surrounded by a raised margin 22. This margin is the inwardly-facing portion of a rim 22a. In practice, the entire tray will ordinarily be made transparent in a single, cast plastic piece. However, the marginal portion may be opaque if preferred. A plurality of apertures 23 are formed in the rim. One of said apertures is shown enlarged in FIG. 5. It is formed in a dimple 24 in the rim and includes a central opening 25 with a pair of slots 26, 27 opening into said hole, these slots being aligned with one another. A plurality of posts 28 are provided, preferably four in number as shown, the apertures and posts being disposed at the four corners of the tray.

Figure 3:
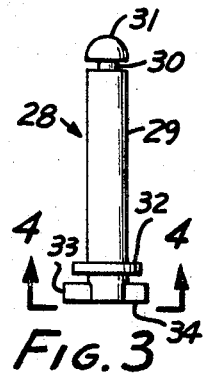
FIG. 3 is a side elevation of a portion of FIG. 2.
Figure 6:
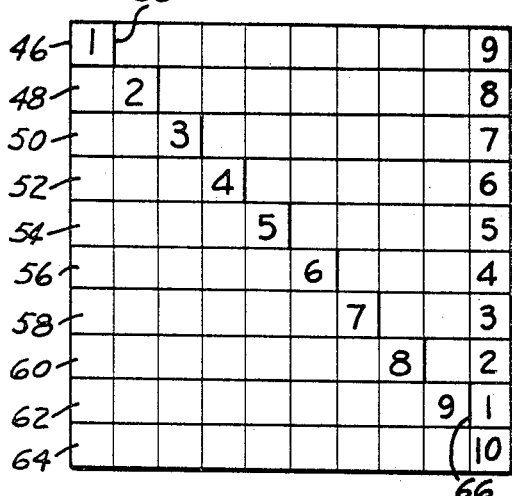

One of such posts is shown in FIG. 3 which includes a shank 29, and a retention groove 30 near a rounded end 31. Near the other end is a shoulder 32 adapted to engage the top side of the dimple, and axially spaced therefrom is a pair of angularly spaced-apart pins 33, 34 which are adapted to pass through slots 26, 27, respectively. When the pins pass to the back or bottom side of the raised marginal portion, shoulder 32 bears against the top, and the post is turned 90° so that the post is firmly engaged to the tray. This provides a convenient bayonet attachment means whereby the post may be attached to any of the trays, and may readily be removed should the post create a nuisance or impediment in the use of any tray which may bear the post. It also provides a means for stacking a plurality of said trays as shown in FIG. 11, and, with the apertures, forms lateral-restraint means.

The bottom tray may be provided with the posts and then the other trays may be slid over the posts and held in a regular, vertical stack, with whatever they are carrying laying atop the respective central transparent portions and trapped between contiguous trays by the margin and the overlaying tray. This gives a full and convenient storage means for the stack and reduces the devices to the least bulk. The retention groove 30 impedes the removal of the trays from the post unless they are pulled directly upwardly, which of course requires a deliberate effort. This keeps the stack firmly assembled.

While the apertures have been shown as holes through the trays, it will be understood that they could be slots open at the edges, or numerous other shapes, the common feature of which is that the trays at least partially embrace the posts so as to be retained by them.

Each tray is adapted to be used in a teaching system of the type shown in FIG. 12 which enables the teacher to do his work facing the class and to provide, by making a small drawing or small manipulation on the central portion, an enlarged showing of what he has done which can readily be viewed by the entire class. For this purpose a projector 35, which is shown schematically as including a light source 36 and a projector lens 37, is adapted to throw a beam upwardly along an axis 38, through the central rectangular portion of one of the trays. This beam strikes lens 39a, mirror 39b, and lens 39c, and is thereby projected onto a screen 40 which is viewed by the class.

A plurality of transparent pieces 41, 42 are shown in FIGS. 12 and 13 which are projected upon the screen. By way of example, piece 41 is hexagonal, and piece 42 is round. Because they are both projected and transparent they will show in different tones (a difference in shade or tone also being regarded as a difference in color), and this projected view as shown in FIG. 13 will teach the difference in areas of a regular hexagon and a circle, the hexagon fitting neatly within the regular circle. It has been found convenient to make plastic pieces for this purpose of different colors, for example, some of each of the primary colors, so that the parts which are overlapped will be projected in a third color which is formed by two others. However, when the pieces are transparent, still the perimeter boundaries have shadows which are projected, and even though colorless, the mathematic feature is nicely demonstrated. Also, when two pieces of the same color overlap, a part will be of darker hue, and therefore of another color.

The objective of the invention is to provide a mathematics teaching kit and method whereby to teach various mathematical functions. FIG. 1 illustrates a convenient means for illustrating graphs, and comprises an opaque grid 45 constituting opaque lines printed directly on the transparent portion which may be projected as such on the screen. Using a grease pencil or other drawing means which is compatible with the material of which the tray is made, the teacher may draw graphs or other lines or shapes, or overlay the graph with other devices of unit size, to illustrate size, graphing and any other mathematic feature which includes an appreciation of unit size or of graphing. Any other unit-sized or unit-proportional shapes may be overlaid to illustrate their relative relationships.

Others of the trays will preferably be left blank and will not have a grid on them in order that various other mathematical features may be taught. However, the presence of a grid in the background is rarely a disadvantage and often will be advantageous, so that it is not necessary that any tray be provided without the grid.

FIGS. 6–10 illustrate the wide range of mathematical features which can readily be taught with this invention. For example, in FIG. 6 there is shown a plurality of nineteen pieces providing number bars for the purpose of teaching numerical concepts of addition, subtraction, commutation and association. The pieces are numbered 46–64 in the drawings. They are divided by a slit between adjacent members of each pair so as to form individual pieces, such as by slit 65 between pieces 46 and 47. Each pair is physically separate from any other pair. Each piece bears an opaque numeral indicative of its respective size or value in the system, and the piece is therefore individually proportional to this value. For example, pieces 46 and 47 bear numerals 1 and 9; piece 46 being 1 unit long in the horizontal direction and piece 47 being 9 units long. All pieces are one unit wide. The other pieces 62 and 63 bear the reverse relationship, and are divided by a slit 66 between them, in this case the left-hand piece bearing the numeral 9 and piece 63 bearing the numeral 1. It will be noted that the other sets all add up to the number 10, and that piece 64 is 10 units long. It is now possible for the teacher, using the grid-marked tray of FIG. 1 or a plain tray, to stack different ones of the pieces alongside each other or end-to-end so as to indicate a difference in numerical values between them or to reverse them in their orders, to show their commutative and associative properties. This set thereby enables the teacher to teach basic number concepts with ease, and by simply manipulating these various devices using any number he desires to indicate their relationships to one another and the values of their totals.

In this and in other sets, the terms "column" and "row" are used arbitrarily throughout this specification. Essentially they mean two orthogonal axes, and are not limited to vertical or horizontal orientations.

Figure 7:
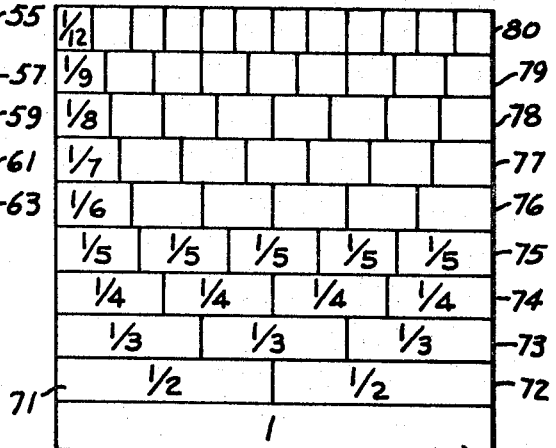

FIG. 7 illustrates a set of pieces for teaching fractions. A unit piece 70 is shown with the number 1. It extends in one complete piece for ten units from left to right in the set. Again, these units could be vertical instead of horizontal. All pieces are one unit wide. Pieces 71, 72 are marked with the fraction ½, and each is half the length of the piece 70. Sets 73, 74, 75, 76, 77, 78, 79, and 80 are respectively divided into thirds, fourths, fifths, sixths, sevenths, eighths, ninths and twelfths, each one bearing the fraction in printed opaque form suitable for projecting its value. It will now be seen that the various relative values of fractions may readily be taught, such as that 4/4 equals 2/2 equals 1. It may readily be perceived how the teacher can teach the use and additive properties of fractions with ease.

The system of FIG. 8 is intended to teach the principles of radix, or base of numbers, and these bases are conveniently shown relative to a decimal point location and showing the place value in each base system. This device includes strips 85–94 which extend the full distance from left to right and are divided between each other along horizontal lines such as along line 95, which divides strips 85 and 86. They are adapted to be displayed side by side either all at once or any two as they are being compared, or one at a time while it is being used. A grid-marked tray may be used for ease in alignment and reference. The teacher can not only write on these transparent pieces but can also write adjacent to same on the transparent portion if he is not using the entire transparent portion himself. The drawings would be unnecessarily complicated by the full lettering. A suitable group is defined by the following table:

| | | | | | |
|---|---|---|---|---|---|
| Base 10 | (10,000's) | (1,000's) | (100's) | (10's) | (1's) |
| Base 9 | (6,561's) | (729's) | (81's) | (9's) | (1's) |
| Base 8 | (4,096's) | (512's) | (64's) | (8's) | (1's) |
| Base 7 | (2,401's) | (343's) | (49's) | (7's) | (1's) |
| Base 6 | (1,296's) | (216's) | (36's) | (6's) | (1's) |
| Base 5 | (625's) | (125's) | (25's) | (5's) | (1's) |
| Base 4 | (256's) | (64's) | (16's) | (4's) | (1's) |
| Base 3 | (81's) | (27's) | (9's) | (3's) | (1's) |
| Base 2 | (16's) | (8's) | (4's) | (2's) | (1's) |
| | | | decimal point | | |
| Base 10 | (1,000's) (100's) (10's) | | (1's) ↓ (.1's) | (.01's) | (.001's) |

The system of FIG. 9 is intended to show various geometrical relationships by permitting manipulation of different pieces having sides of some selected length. These are most easily provided and suppled in the form of three basic pieces, 100, 101, 102, which are conveniently made separately but which, when placed side by side, will about fill the tray inside the margin. Each of these includes scrap portions which will not be useful in the ultimate use of the system. A detailed description of strip 100 will be suitably descriptive for the remaining ones. It includes a circle 103, a parellelogram 104, a right triangle 105 and a square 106. These are formed by a die cut made in a flat piece of transparent plastic which may be colored any desired color, or left colorless if desired. These pieces may be removed from the scrap portion 107 and this remainder outside section is discarded, leaving the salient pieces ready for use in the way suggested in FIGS. 12 and 13.

FIG. 10 shows ten strips 110, all of which are alike and all of which are rectangular rectangules 10 units in length and 1 unit in width. Again, the length and width may be vertical or horizontal, without limitation. These may be provided in various colors, or left transparent and may be marked up and used by the teacher as desired, or they may be scored so as to be readily separated, or may be cut by scissors to appropriate lengths and sizes to illustrate any mathematical function the teacher may have in mind. It may be convenient to provide three or four of these strips in the color blue; some in the color red and some in the color yellow or green, so as to enable different contrasting colors to be obtained by overlays. Similarly, in the system shown in FIGS. 6 and 7, different ones of the horizontal elements might be given different colors.

The material of which the trays and the transparent pieces are made should be tough enough to stand up to hard classroom wear and abuse, but still not so hard as to create sharp corners and edges which might cut the teacher or the student. A suitable composition is butyrate sold by Eastman Chemicals Corporation, Kingsport, Tenn., under its number 406, in the condition medium hard. Similarly, polyvinyl chloride may be used having a shore reading of about 75. These are tough, durable compositions which still are relatively soft and will not cut the user. They are also readily worked, in the sense of being easily die cut or sheared with scissors or otherwise, and have good optical properties which permit transparent projection of themselves and of their silhouettes.

The stored configuration for the kit is shown in FIG. 11. The usage configuration of the individual tray is shown in FIG. 12. The posts may be applied to any of the trays and more than one tray may be utilized at one time in projection. The kit is easily stored in small bulk, the loose pieces being firmly held in the stacked configuration, the stacked configuration readily being disassembled to remove the desired tray and the remaining trays may readily be stored where they will be safe.

FIGS. 14 and 15 are intended to indicate that there is a considerable range of lateral-restraint means available. Basically, these trays are intended to be stacked in a regular, vertical pile. The margin may, as in FIG. 1, be formed directly on a rim which, when stacked, even without the posts, will keep the pile orderly and the parts between the trays, but without the same structural connection.

In FIG. 14, trays 150 and 151 have the same features as the trays in FIG. 1, but a more accentuated rim 152. These stack without posts, the rims acting as lateral-support means.

In FIG. 15, trays 155 and 156 includes projections 157 and reentrant cavities which cooperate to form lateral-restraint means.

It will thereby be noted that cooperative, mutually engaging-laterally spaced-apart structures may be formed which, when the trays are in a stack, keep the stack aligned and the trays in a pile.

This invention thereby provides a method for the teaching of mathematics with optimum results both in the image projected to the students and in the control of the teacher over the behavior of his class. The device may be made of inexpensive materials which are long-lived and readily usable. In addition to the mathematic features and functions suggested and shown in the examples, it is obvious that different features and functions may be taught, such as by drawing on the trays as provided or by forming the pieces in different configurations, and it is preferred that the tray material be receptive to crayons and the like, but resistant to them so that drawings and sketches made by these substances can be removed by wiping or scrubbing.

This invention is not to be limited by the embodiments shown in the drawings and described in the description, which are given by way of example and not of limitation, but only in accordance with the scope of the appended claims.

What is claimed is:

1. A mathematics-teaching kit comprising: a plurality of trays, each tray having a transparent flat rectangular portion and a surrounding raised margin; lateral-restraint means on each of said trays adapted to enable said trays adapted to enable said trays to be stacked in a regular vertical stack, said lateral-restraint means comprising a plurality of posts carried by one of the trays and a plurality of apertures carried by the other trays, said apertures being adapted to engage a respective one of said posts; and a plurality of transparent plastic pieces which are representative of a mathematical feature to be taught, which pieces are adapted to lay upon the rectangular portion of at least one of said trays and to fit on it within the margin, whereby the material on the tray may be projected onto a screen by a projector whose light is thrown through the said rectangular portion.

2. A mathematical-teaching set according to claim 1 in which the tray bearing the posts has a plurality of apertures, each of said apertures having a central hole and a pair of angularly spaced-apart slots opening into said hole, each of said posts including a shank, a shoulder adapted to bear against the marginal portion, and a pair of angularly spaced-apart pins adapted to pass through the slots and, when the post is turned, to bear against the reverse side of the marginal portion to hold the post assembled to the respective tray.

3. A mathematics-teaching kit comprising: a plurality of trays, each tray having a transparent flat central rectangular portion and a surrounding raised marginal portion; a plurality of posts mounted to and rising from the marginal portion of one of said trays, the other trays having apertures in their respective marginal portions adapted to receive and embrace said post so as to hold the plurality of trays in a stack which may be disassembled by removing the trays from the post; and a plurality of transparent plastic pieces which are representative of a mathematical feature to be taught, which pieces are adapted to lay upon the rectangular portion of at least one of said trays and to fit within the marginal portion; and in which the transparent plastic pieces also comprise nine pairs of strips whose lengths are proportional to successive integral numbers from one through nine, whereby nine sets of two pieces adding to a length of ten units are included, and a strip whose length is proportional to the number 10, the strips bearing opaque indicia representative of their respective lengths, whereby additive and subtractive operations may be conducted by manipulation of said strips; and in which the transparent plastic pieces also comprise a plurality of sets, the lengths of whose members is proportional to a fraction having one as numerator and an integer as denominator, the sets including the integers two, three, four, five and six; in which the transparent plastic pieces also comprise a plurality of strips of equal length, and bear when aligned in parallelism a plurality of columns indicative of the value of a number in that column, based upon a respective radix; and in which the transparent pieces include a plurality of geometric shapes.

4. A mathematical-teaching set according to claim 3 in which the rectangular portion of at least one of said trays is square, and bears an oqaque rectangular grid.

References Cited

UNITED STATES PATENTS

| | | | |
|---|---|---|---|
| 356,167 | 1/1887 | Shannon | 35—31.6 |
| 3,229,388 | 1/1966 | Smith | 35—31.8 |

OTHER REFERENCES

Transparent Visual Aids Brochure, 2 pages, publication of Physics Research Laboratories, Inc. received Nov. 7, 1960.

Welch Scientific Company Catalog, page 945. Received in Scientific Library Oct. 25, 1965.

LAWRENCE CHARLES, *Primary Examiner.*